Patented May 3, 1949

2,469,318

UNITED STATES PATENT OFFICE 2,469,318

LOW VISCOSITY POLYVINYL BUTYRAL RESINS AND METHODS OF MAKING SAME

Donald R. Swan, Berea, Ohio, assignor, by mesne assignments, to Pittsburgh Plate Glass Company, Pittsburgh, Pa., a corporation of Pennsylvania No Drawing. Application February 15, 1946, Serial No. 648,011

3 Claims. (Cl. 260—17)

This invention relates to polyvinyl resins and more particularly to the precipitation, isolation and purification of low viscosity polyvinyl acetal resins, especially those of the butyral type.

The production of polyvinyl resins by the hydrolysis of polyvinyl esters such as polyvinyl acetate and the condensation of the hydrolysis products with aldehydes is well known. The reactions are carried out in suitable organic solvents which are miscible with water such as methyl alcohol or ethyl alcohol, in the presence of an acid catalyst, and the resinous products are precipitated by adding water to the solutions or pouring the solutions into water. However, the production of polyvinyl acetal resins, and especially polyvinyl butyral resins, of low viscosity by this method has been impractical heretofore because serious difficulties have arisen during precipitation and washing of the material, for the reason that the precipitates have been gummy and incapable of being washed free of impurities and dried in a satisfactory manner. More specifically, it has been possible satisfactorily to precipitate polyvinyl butyral resins made from polyvinyl acetate having a viscosity of 15 or more (throughout this specification, viscosities of polyvinyl acetate, unless otherwise noted, are expressed as the viscosity in centipoises of a solution in benzene containing 86 grams per liter at 20° C,. and are indicated by "V" followed by a numeral corresponding to the viscosity). However, with butyrals prepared from polyvinyl acetate of viscosities of about 10 or below, serious difficulties have been encountered in the precipitation, washing and drying of the resins, the difficulties increasing with the reduction in viscosity of the polyvinyl acetate from which the resins are made. The viscosity of the resins varies approximately in accordance with the viscosity of the polyvinyl acetate from which they are made.

Thus the method of the present invention, while it is of utility in connection with the production of polyvinyl resins of high viscosity, finds its greatest usefulness in the production of resins from polyvinyl acetate of viscosities of 10 to 2 or less, which are referred to herein as low viscosity resins. The invention is disclosed herein in connection with the production of polyvinyl butyral resins. However, it is contemplated that the invention may also be useful in the production of other polyvinyl resins such as polyvinyl esters, polyvinyl acetals of propionaldehyde, 2-ethyl butyraldehyde, 2-ethyl hexaldehyde, heptaldehyde, benzaldehyde, etc., as well as polyvinyl ketals such as those formed by cyclohexanone and cyclopentanone.

Briefly, the operation of my method depends upon my discovery that by the simultaneous precipitation of a cellulose derivative, which can be readily precipitated from a solution in an organic solvent by mixing the solution with water, such as nitrocellulose, cellulose acetate butyrate or ethyl cellulose, with the polyvinyl butyral or other polymer of the vinyl type, crisp, discrete, fibrous precipitates which can be readily washed free from contaminants and dried with little difficulty are obtained. Thus by adding a minor percentage of such a cellulose derivative to a solution of a low viscosity polyvinyl butyral in ethyl alcohol, acetone or the like and then precipitating the synthetic polyvinyl resin and the cellulose derivative by water, a crisp fibrous precipitate is readily obtained. The fibrous material so obtained is a co-precipitate consisting of a major portion of the polyvinyl resin and a minor portion of the cellulose derivative. The nature of the co-precipitate is such that the fibres remain separate and do not gum; accordingly the co-precipitate can be washed substantially free of contaminants in water.

While the precise theory underlying the invention is not definitely known to me, it appears probable that the advantageous results are obtained because the cellulose derivative precipitates more readily than the low viscosity polyvinyl resins, and being harder than the polyvinyl resins, stiffens and hardens the precipitated particles and thus eliminates the tendency of the low viscosity polyvinyl resins to gum. In any event, the co-precipitated material can be handled easily, readily washed free of contaminants by water and easily dried.

The invention is particularly useful in connection with the precipitation of polyvinyl butyral resins made from polyvinyl acetate having viscosities of from about 2 to 10, although it may be used with resins of higher or lower viscosities. In carrying out the operation, a sufficient quantity of cellulose derivative, such as nitrocellulose, cellulose acetate butyrate or ethyl-cellulose is added to the solution so that the precipitate will contain preferably from about 10 to 50 percent cellulose derivative. Those skilled in the art can readily determine the quantity of cellulose derivative needed to produce the desired percentage in the finished product, for nearly all of the polyvinyl resins and cellulose derivative present in the solution are recovered as the fibrous precipitate. It appears that at least about 8 percent of cellulose derivative is required in order to produce crisp, fibrous, easily washable precipitates, and if more than about 50 percent is employed, the precipitated resins lose much of the toughness characteristic of polyvinyl butyral resins.

The following examples will serve to illustrate the invention:

*Example 1—Polyvinyl butyral and nitrocellulose.*—A solution was made up consisting of 172 grams of polyvinyl acetate (V-7) dissolved in 600 cc. of 95 percent ethyl alcohol. Into this were stirred 80 cc. of butyraldehyde and 50 cc. of concentrated hydrochloric acid. The reaction was permitted to go on for four days at 40° C. then 2000 cc. of 95 percent alcohol and 24 grams of sodium hydroxide were added. The alkali was used to neutralize the acid. Neutralization of the acid is unnecessary if precipitation is carried out promptly.

To this solution, a solution consisting of 50 grams of 65 percent 6 second cellulose nitrate in 500 cc. of acetone was added. The resulting solution thus contained cellulose nitrate and polyvinyl butyral and the other products of the hydrolysis and condensation of the polyvinyl acetate and butyraldehyde. This solution was poured into a stream of water which resulted in the precipitation of the polyvinyl butyral and the cellulose nitrate in the form of crisp fibres which did not gum and which were easily and quickly washed free of contaminants. Calculations show the precipitate to contain about 20 percent of cellulose nitrate.

A test portion of the same polyvinyl butyral solution to which no cellulose nitrate had been added gave a partly fibrous and partly gummy precipitate which could not be washed and dried satisfactorily.

*Example 2—Polyvinyl butyral and nitrocellulose.*—A partly gummy precipitate of polyvinyl butyral was produced by the hydrolysis and condensation of polyvinyl acetate (V-7) with butyraldehyde, the precipitate being obtained by pouring the solution into water without the addition of cellulose nitrate. The precipitate was of such a nature that it could not be satisfactorily handled and freed from contaminants.

The partly gummy precipitate so obtained was then dissolved in sufficient acetone to make an approximately 10 percent solution of polyvinyl butyral in acetone. To this solution a solution of 20 grams of 65 percent 6 second cellulose nitrate in acetone was added and this solution of cellulose nitrate and polyvinyl butyral was precipitated by pouring the solution into a stream of water. A crisp fibrous precipitate was obtained which showed no tendency to gum and which was washed and dried readily.

*Example 3—Polyvinyl butyral and nitrocellulose.*—A solution of 172 grams polyvinyl acetate (V-7) in 600 cc. of 95 percent ethyl alcohol to which 80 cc. of butyraldehyde and 50 cc. of hydrochloric acid (specific gravity 1.18) had been added, was permitted to react for four days at 40° C. Then 40 cc. of butyraldehyde were added. After two days more the resin, which was insoluble in the reaction mixture, had settled out as a viscous lower layer.

Both layers were then rapidly poured into two liters of 95 percent ethyl alcohol containing 24 grams sodium hydroxide to neutralize the hydrochloric acid. The mixture was permitted to settle and then the supernatant liquid was poured off, thus removing some of the contaminants. The residual mass of soft resin was then dissolved in approximately 1000 cc. of 95 percent ethyl alcohol to which about 50 cc. of butyl cellosolve ($C_4H_9 \cdot O \cdot CH_2 \cdot CH_2OH$) had been added in order to insure complete solution of the resin. 100 grams of ¼ second nitrocellulose (65 grams dry weight) dissolved in 500 cc. acetone were then mixed with the solution of butyral resin in alcohol. The resultant mixture was poured into a stream of water, precipitating the butyral resin and the nitrocellulose in the form of a white fibrous precipitate which was easy to wash and dry without gumming or agglomeration. The yield was 184 grams of air dried material of which about 65 grams or 35 percent was cellulose nitrate. It is to be noted that the butyral produced by this method had a very low hydroxyl content. Such butyrals are somewhat softer than those having a greater hydroxyl content.

*Example 4—Polyvinyl butyral and ethyl cellulose.*—A polyvinyl butyral solution was prepared by reacting 688 grams of polyvinyl acetate (V-7), 160 cc. of hydrochloric acid of 1.18 specific gravity and 320 cc. of butyraldehyde in 2000 cc. of ethyl alcohol for four days at 40° C. To 100 cc. of the resulting solution 200 cc. of alcohol and 15 grams of ethyl cellulose (having an ethoxyl content of about 47 percent by weight and a viscosity of 22 cp. in 5 percent by weight solution in 80 percent toluene and 20 percent ethyl alcohol at 25° C.) dissolved in 100 cc. of acetone were added. This solution was poured into a stream of water, and the resultant precipitate consisted of well separated white fibres which did not agglomerate or gum, which were readily washed free of impurities and dried. This co-precipitate of polyvinyl butyral and ethyl cellulose contained about 50 percent ethyl cellulose.

An attempt was made to precipitate and wash the butyral resin from the same original solution without the addition of ethyl cellulose. This was done by adding 200 cc. of alcohol and 100 cc. of acetone to 100 cc. of the original solution. When this mixture was poured into a stream of water, the resin precipitated as a white fibrous mass which gummed and agglomerated to such an extent that washing and subsequent drying even on a laboratory scale was difficult, and the nature of the precipitate was such that washing and drying on a commercial scale would have been quite impractical. A solution of 5 percent by weight of this resin in ethyl alcohol had a viscosity of 12 seconds in a No. 4 Ford cup at 80° F.

*Example 5—Polyvinyl butyral and cellulose acetate butyrate.*—A solution of polyvinyl butyral was prepared by reacting 172 grams of polyvinyl acetate (V-7), dissolved in 600 cc. of 95 percent ethyl alcohol and 80 cc. butyraldehyde in the presence of 40 cc. of hydrochloric acid (specific gravity 1.18). The reaction was carried on at 40° C. for four days with occasional stirring.

A solution containing 15 grams of cellulose acetate butyrate in 300 cc. of acetone was added to the resin solution and then the resulting solution containing polyvinyl butyral and cellulose acetate butyrate was precipitated by pouring into a stream of water. The resultant precipitate was crisp and fibrous and was washed and dried without difficulty. The cellulose acetate butyrate used contained 16 percent butyryl and was of 4 seconds viscosity.

*Example 6—A 2-ethyl butyral of polyvinyl alcohol and nitrocellulose.*—A 2-ethyl butyral of polyvinyl alcohol was prepared by reacting the following materials:

| | | |
|---|---|---|
| Polyvinyl acetate (V-7) | g | 86 |
| 95% ethyl alcohol | cc | 270 |
| Butyl cellosolve | cc | 30 |
| Hydrochloric acid (specific gravity 1.18) | cc | 20 |
| 2-ethyl butyraldehyde | g | 50 |

After six days at 40° C. the 2-ethyl butyral resin had settled as a soft mass at the bottom of the reaction vessel inasmuch as this resin is not soluble in alcohol. The resin was redispersed in the alcohol and a solution formed by adding 100 cc. of butyl cellosolve and 900 cc. of acetone containing 34 grams of ¼-sec. nitrocellulose. The amount of nitrocellulose present was equivalent to approximately 22 grams of dry nitrocellulose or about 30 percent by weight of the polyvinyl 2-ethyl butyral in the solution.

The resulting solution was poured into a stream of water and precipitated readily, forming a crisp, fibrous precipitate which was readily washed and dried.

*Example 7—A cyclohexanone-al of polyvinyl alcohol, and nitrocellulose.*—A cyclohexanone-al of polyvinyl alcohol was prepared by reacting the following materials for six days at 40° C.:

| | | |
|---|---|---|
| Polyvinyl acetate (V-7) | g | 86 |
| 95% ethyl alcohol | cc | 270 |
| Butyl cellosolve | cc | 30 |
| Hydrochloric acid (specific gravity 1.18) | cc | 20 |
| Cyclohexanone | g | 100 |

Thereafter 500 cc. of butyl cellosolve and 500 cc. of alcohol containing 34 grams of ¼-sec. nitrocellulose were added. The amount of nitrocellulose present was equivalent to approximately 22 grams of dry nitrocellulose or about 30 percent by weight of the polyvinyl cyclohexanone-al in the solution.

The resulting solution was poured into a stream of water and precipitated readily, forming a crisp, fibrous precipitate which was readily washed and dried.

Polyvinyl resins of various types are of considerable commerical importance, for example polyvinyl butyral resins of high viscosity are of great importance as the interlayer in safety glass. Because of their toughness and clearness, polyvinyl butyral resins are also useful in the surface finishing arts. However, the high viscosity resins used in the production of safety glass and which can be produced easily by heretofore known methods, are of little use in the surface finishing arts because of their poor spraying properties. For example, ordinary nitrocellulose lacquers are formulated so that they can be sprayed in a concentration of from about 18 to about 30 percent total solids, whereas the usual high viscosity polyvinyl butyral can only be sprayed without webbing only in solutions of about 2.5 percent solids. Low viscosity polyvinyl butyral resins, i. e., those made from polyvinyl acetate of a viscosity of 10 to 2 and preferably of about 5 or 6, can be sprayed at satisfactory concentrations of solids, for example, of about 8 to 12 percent, and thus are highly useful in the surface finishing art. The present invention provides an efficient and economical method for producing such low viscosity resins, and particularly for producing resins adapted for use in sealers, sanding sealers, lacquers and the like useful in the finishing of wood. The relatively small percentages of cellulose nitrate or other cellulose derivative present in the precipitates usually have no deleterious effect on the final product, and with many surfacing materials are advantageous; hence the co-precipitates have many uses, and it is ordinarily unnecessary to separate the cellulosic materials from the polyvinyl resins. Thus the resinous materials and the method of my invention are especially useful in the manufacture of coating materials of various sorts, although the invention is obviously not limited to this use.

I claim:

1. The method of obtaining a crisp, fibrous, readily washable precipitate containing at least 50 percent of a low viscosity polyvinyl butyral resin made from a polyvinyl acetate having a viscosity of not more than 10 centipoises at 20° C. in a solution in benzene containing 86 grams per liter which includes the steps of adding to a solution of such resin in an organic solvent which is miscible with water, a sufficient quantity of a cellulose derivative from the group consisting of nitrocellulose, cellulose acetate butyrate and ethyl cellulose to make a solution in which the cellulose derivative constitutes from 10 to 50 percent of the total weight of resin and cellulose derivative in the solution, and simultaneously precipitating the resin and cellulose derivative by mixing the solution with water.

2. The method of making a precipitated polyvinyl butyral resin which includes the steps of mixing polyvinyl acetate having a viscosity of not more than 10 centipoises at 20° C. in a solution in benzene containing 86 grams per liter, with butyraldehyde in an organic solvent in the presence of a mineral acid catalyst, heating to produce the polyvinyl butyral resin, recovering the resin from solution in said solvent by adding a sufficient quantity of a cellulose derivative from the group consisting of nitrocellulose, cellulose acetate butyrate, and ethyl cellulose to make a solution in which the cellulose derivative constitutes from 10 to 50 percent of the total weight of resin and cellulose derivative in the solution, then co-precipitating the resin and the cellulose derivative by mixing the solution with water, washing the co-precipitate substantially free from impurities with water, and drying the co-precipitate.

3. A resinous material consisting essentially of a co-precipitate of a polyvinyl butyral resin made from a polyvinyl acetate having a viscosity of not more than 10 centipoises at 20° C. in a solution in benzene containing 86 grams per liter and a cellulose derivative from the group consisting of nitrocellulose, cellulose acetate butyrate, and ethyl cellulose, said material being in the form of white, discrete fibers and containing at least 50 percent of said resin and from 10 to 50 percent of said cellulose derivative.

DONALD R. SWAN.

REFERENCES CITED

The following references are of record in the file of this patent:

FOREIGN PATENTS

| Number | Country | Date |
|---|---|---|
| 483,222 | Great Britain | Apr. 8, 1938 |